United States Patent [19]
Oppliger et al.

[11] Patent Number: 5,638,941
[45] Date of Patent: Jun. 17, 1997

[54] APPARATUS FOR LOADING THE CONTAINERS OF A DISTRIBUTING CONVEYOR

[75] Inventors: Jean-Claude Oppliger, Niederhasli; Beat Fritsche, Greifensee, both of Switzerland; Thomas Zimmermann, Wutöschingen, Germany

[73] Assignee: GRAPHA-Holding AG, Hergiswil, Switzerland

[21] Appl. No.: 507,026

[22] Filed: Jul. 25, 1995

[30] Foreign Application Priority Data

Aug. 2, 1994 [CH] Switzerland .................. 02413/94

[51] Int. Cl.[6] .................................................. B65G 37/00
[52] U.S. Cl. ................... 198/576; 198/464.3; 198/860.3; 198/459.8
[58] Field of Search ............... 198/459.8, 461.1, 198/461.2, 575, 576, 577, 464.1, 464.3

[56] References Cited

U.S. PATENT DOCUMENTS

| | | | |
|---|---|---|---|
| 3,339,699 | 9/1967 | Harrison et al. | 198/576 X |
| 4,267,917 | 5/1981 | Vogel | 198/459.8 X |
| 4,469,219 | 9/1984 | Cossé | 198/460.2 |
| 4,915,209 | 4/1990 | Canziani | 198/464.3 X |
| 5,495,932 | 3/1996 | Dyess | 198/464.1 |

FOREIGN PATENT DOCUMENTS 0248813  11/1986  Japan .................. 198/464.1

*Primary Examiner*—James R. Bidwell
*Attorney, Agent, or Firm*—Spencer & Frank

[57] ABSTRACT

An apparatus for loading containers of a distributing conveyor with flat product includes an endless belt including a plurality of ribs that define at least one compartment that forms a support surface for supporting the flat product. The endless belt is moved in a cyclical motion between resting positions for conveying the flat product supported on the support surface into a container. A cover element forms with the at least one compartment a laterally open shaft into which the flat product is deposited.

9 Claims, 4 Drawing Sheets

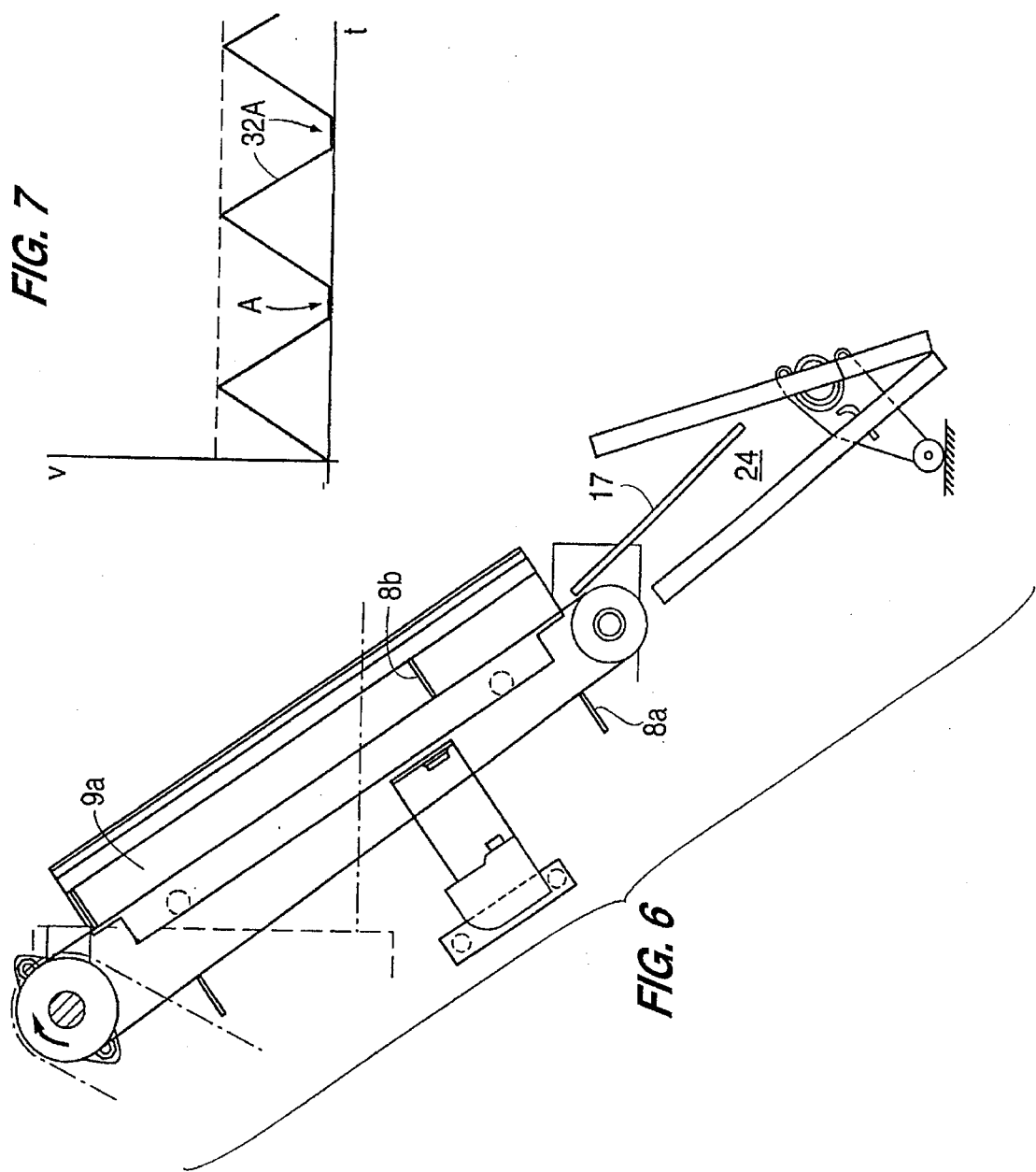

APPARATUS FOR LOADING THE CONTAINERS OF A DISTRIBUTING CONVEYOR

REFERENCE TO RELATED APPLICATIONS

This application claims the priority of application Ser. No. 02 413/94-4, filed Aug. 2, 1994 in Switzerland, which is incorporated herein by reference.

BACKGROUND OF THE INVENTION

The present invention relates to an apparatus for loading the containers of a distributing conveyor with flat products, such as pieces of mail. The apparatus includes a preferably inclined support surface, and means for conveying the flat product supported thereupon into a container in a cyclical motion.

An apparatus of this type is disclosed in European Patent Application 0 519 375. FIG. 10 of this document shows an apparatus that includes a flap which is disposed at the lower end of the inclined support surface and that can be pivoted away. Disposed above the flap is a rotatable roller, which extends into an opening of the support surface and cooperates with a clamping roller to grip a piece of mail. The clamping roller can pivot in order to be brought against a driven roller under spring pressure. When the flap is pivoted back, a piece of mail held securely between the rollers can be deposited into a container due to a downward rotation of the driven roller. A disadvantage of this apparatus is that delicate items, such as eyeglasses or compact discs located within the pieces of mail, can be damaged by the pressure of the two rollers.

SUMMARY OF THE INVENTION

It is an object of the present invention to create an apparatus of the above-named type that ensures gentler handling of the flat products to be conveyed, and is particularly suited for conveying pieces of mail. In particular, the apparatus is used to deposit pieces of mail of varying thickness, surface area, and mass into a preselected container of a distributing conveyor with uniform precision.

This object is accomplished according to the invention by providing an apparatus for loading containers of a distributing conveyor with flat product, comprising an endless belt including a plurality of ribs defining at least one compartment forming a support surface for supporting the flat product; and means for moving the endless belt in a cyclical motion between resting positions for conveying the flat product supported on the support surface into a container.

With the use of the invention, the flat product only rests at the front or back against a rib of the belt, and is not clamped in any way. The belt is essentially conveyed independently of the thickness, surface area, and weight of the product.

The apparatus according to the invention permits a very precise deposit of the flat product due to the precise positioning capability of the ribs, resulting in a subsequently high output. Because greatly varying pieces of mail can be handled, they need not be pre-sorted as precisely as before. Experiments have shown that at least three pieces of mail can be conveyed per second with the apparatus of the invention.

Finally, the apparatus of the invention is distinguished by a very simple design having few components.

BRIEF DESCRIPTION OF THE DRAWINGS

These and other features and advantages of the invention will be further understood from the following detailed description of a preferred embodiment with reference to the accompanying drawings.

FIGS. 4 through 6 schematically show the deposit of a product onto the distributor conveyor.

FIG. 7 shows the operating speed of the ribbed belt as a function of time.

DETAILED DESCRIPTION OF THE PREFERRED EMBODIMENT

Figure 1:
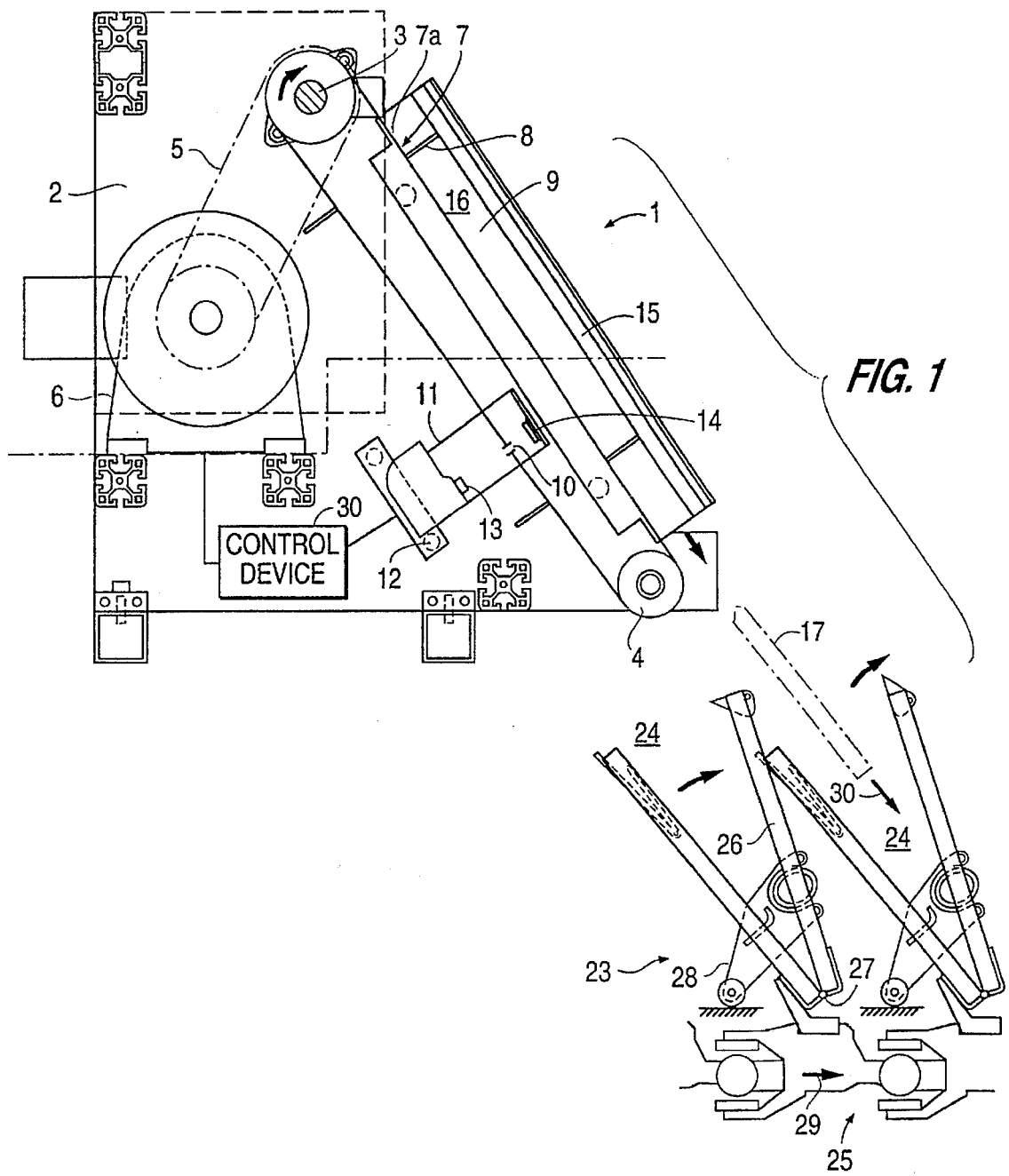
FIG. 1 shows a side view of an apparatus according to the invention, as well as a partial view of a distributing conveyor, respectively.
Figure 2:
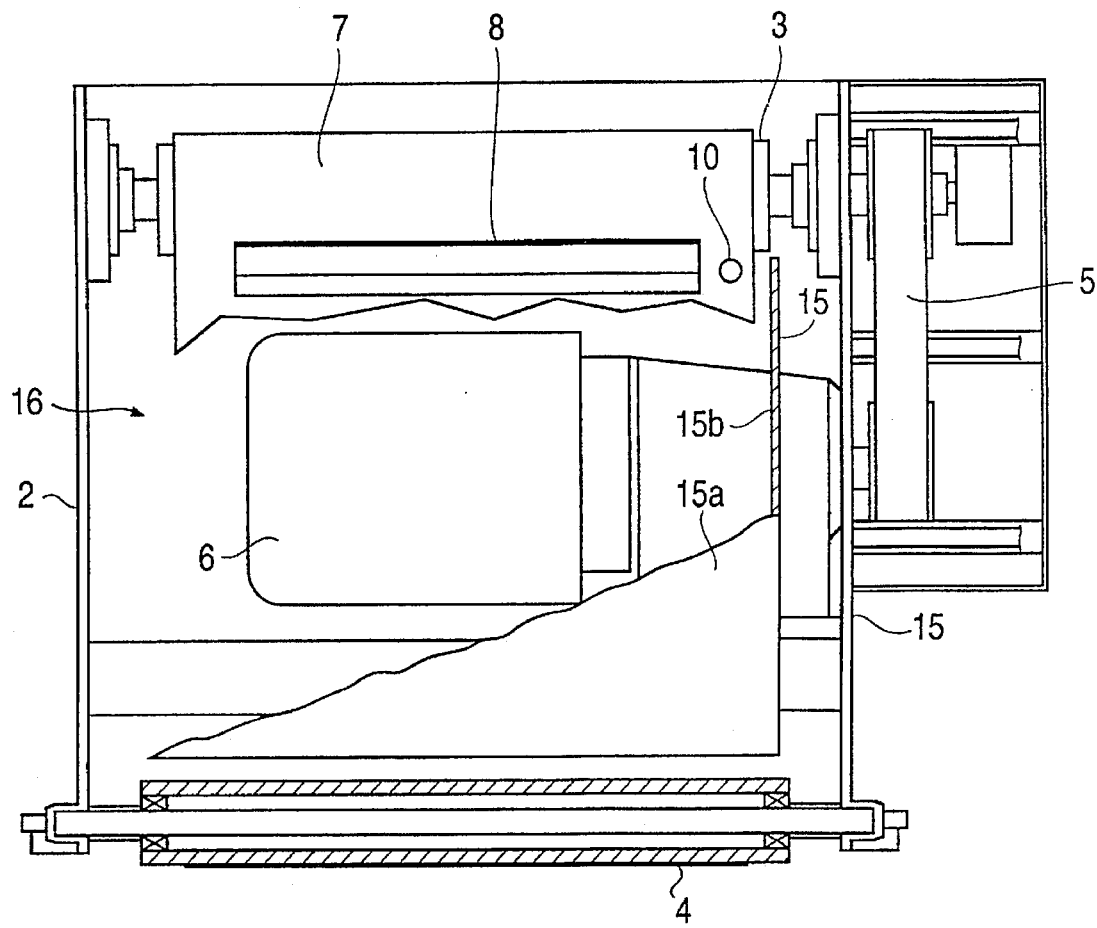
FIG. 2 shows a plan view of the apparatus in partial section.

As shown in FIGS. 1 and 2, the apparatus 1 has a stand 2, on which a belt-drive roller 3 and a reversing roller 4 are rotatably seated. Belt-drive roller 3 is connected via a drive element 5 to a controllable motor 6 seated securely on stand 2. An endless ribbed belt 7 having four vertically-spaced ribs 8 travels around the two rollers 3 and 4. The four ribs 8 form four respective, partially enclosed belt compartments 9.

In order to control the position of the ribs, belt 7 has at least one opening 10, to which a light barrier 11 responds. Light barrier 11 is attached to a holder 12 securely connected to the stand. In a conventional manner, light barrier 11 has a light source 13 and a reflector 14. Light source 13 emits a pulse which passes through opening 10 to be detected by reflector 14. Light barrier 11 can be replaced by different, but similarly-acting, means, for example magnetically-operating means (not shown).

Controllable motor 6 is operatively connected to light barrier 11. The signal from light barrier 11, generated in connection with the pulse emitted by light source 13, is sent to a control device 30. Using this signal, control device 30 controls the movement and operation of controllable motor 6, as will be Subsequently explained, in a known manner.

As shown in FIG. 2, ribs 8 extend essentially over the entire width of belt 7. A sheet 15 of metal, which includes a side wall 15b that acts as a side stop and an upper guide wall 15a that superposes an upper run 7a of belt 7 with a spacing, is securely attached to stand 2 adjacent to belt 7. A compartment 9 located beneath sheet 15 forms a laterally open shaft 16 (FIG. 1) with the sheet. In the view according to FIG. 2, the opening of shaft 16 is on the left, through which flat products 17 are respectively deposited into the shaft (see also FIG. 3).

Figure 3:
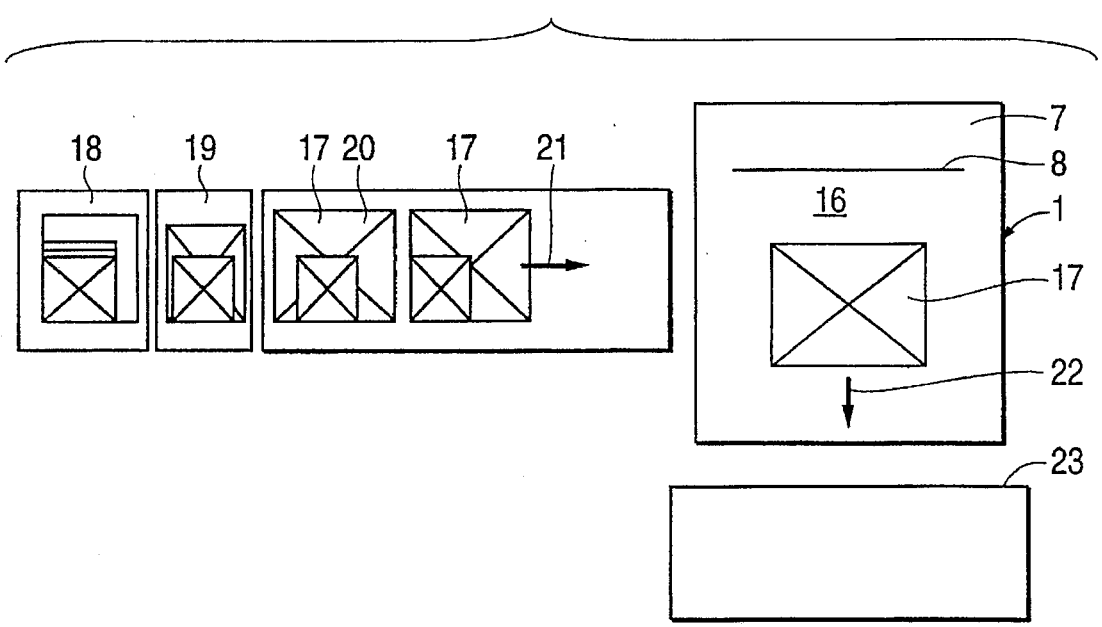
FIG. 3 schematically show the course of movement of a piece of mail in the region of the apparatus of the invention.

As shown in FIG. 3, in the preferred use of apparatus 1 in a mail-sorting facility, a feeder 18, a reader 19, and a feed belt 20, for example, are located in front of apparatus 1 when seen in the direction of conveyance 21. The flat products 17 are separated on feed belt 20, and can be deposited laterally into a respective compartment 9, and thus between two adjacent ribs 8 of belt 7. In FIG. 3, the direction of conveyance, as indicated by the arrow 21, is the direction in which flat products 17 are thrown onto belt 7. With its upper guide wall 15a, sheet 15 forms a guide and, with side wall 15b, a stop for a product 17 to be deposited.

As seen in the direction of conveyance 22, a distributing conveyor 23 is disposed after apparatus 1. Referring also to FIG. 1, conveyor 23 includes a plurality of containers 24, which are disposed one behind the other on a drawing element 25 that is driven to circulate. Containers 24 can be pivoted beneath apparatus 1 in order to receive a respective flat product 17. This type of distributing conveyor is known from Swiss Patent Application 01 962/94. However, distributing conveyor 23 can also be a different known distributing conveyor.

The containers 24 shown in FIG. 1 respectively have a side wall 26 which can be pivoted about a pivot axis 27 by means of a locking and control element 28. Seen in a direction of travel indicated by arrow 29, side wall 26 is pivoted directly in front of apparatus 1 such that a flat product 17 thrown diagonally downward in the direction of arrow 30 can be deposited in container 24. For interference-free transport, it is crucial that products 17 be thrown to distributing conveyor 23 from apparatus 1 at precisely the right time and in cycle.

Typically, a plurality of apparatuses 1 is allocated to one distributing conveyor 23. Apparatuses 1 are then preferably loaded alternatingly from the left or right. In such an embodiment (not shown), another feed belt 20 would be located to the right of a second apparatus 1 having a side wall 15b correspondingly located to the left so that loading of the two apparatuses would readily take place alternatingly from the left and right.

The control of belt 7 is explained in detail below in conjunction with FIGS. 4 through 7. For apparatus 1 to be loaded with a product 17, belt 7 is located in the position shown in FIG. 4. In this position, a compartment 9 on upper run 7a is located approximately centered between rollers 3 and 4. When the product 17 is deposited into compartment 9, belt 7 is held briefly in this inoperative position. This corresponds to one of positions A represented in FIG. 7, which shows the operating speed of the ribbed belt as a function of time.

Figure 4:
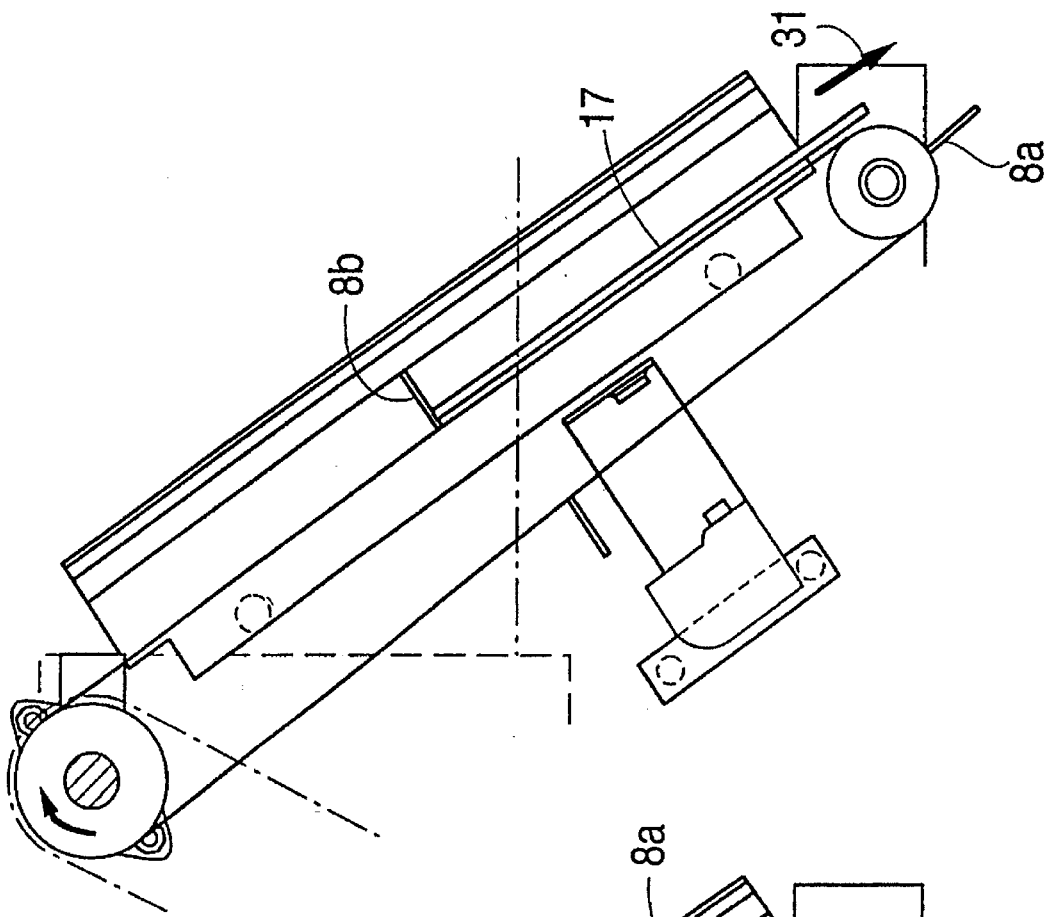
Figure 5:
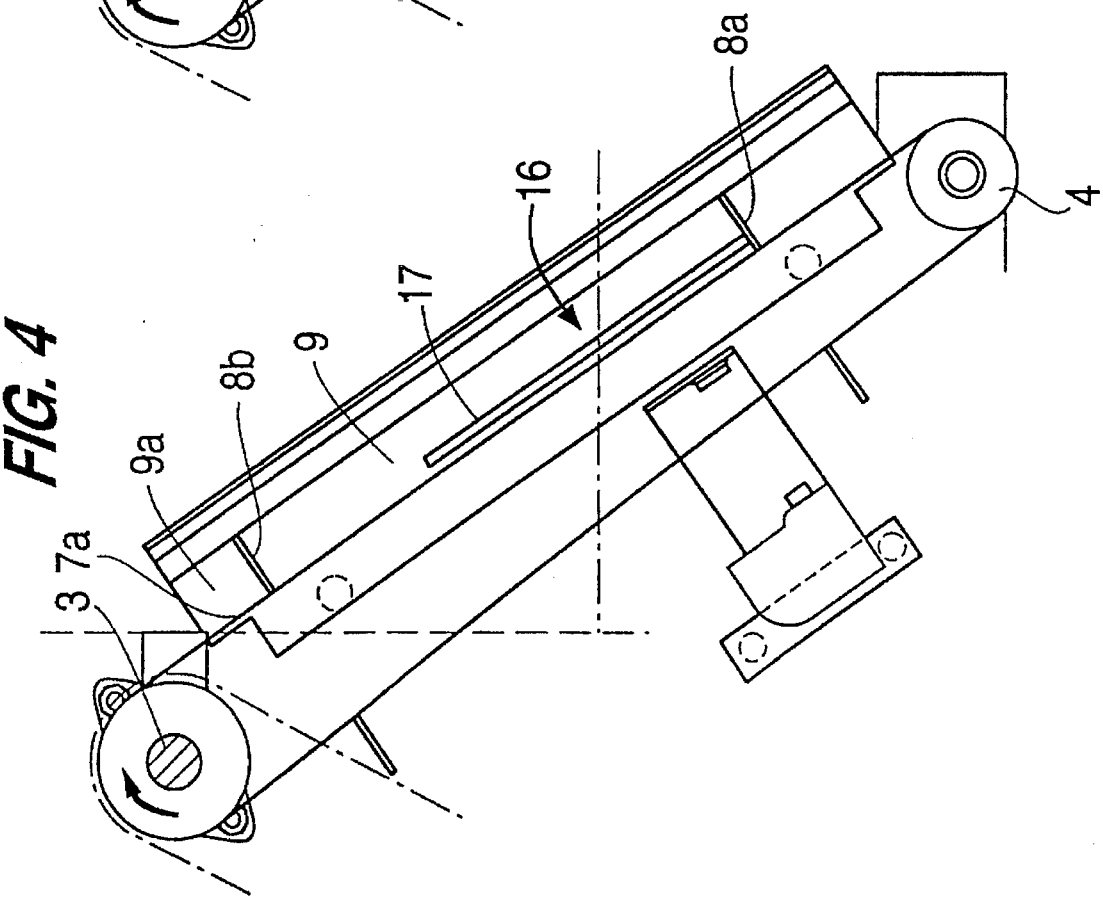

Once product 17 is deposited into compartment 9, belt 7 is accelerated, so that the product is moved downwardly in the direction of arrow 31, as shown in FIG. 5. Normally, product 17 is pushed downwardly by a rib 8b, which is located behind a rib 8a, and which collectively form the compartment 9. Once rib 8b is in approximately the position shown in FIG. 6, the movement of belt 7 is slowed, as is graphically represented by line 32 in FIG. 7, and then stopped, so that the inoperative position shown in FIG. 4 is obtained for the depositing of a next product 17 into a subsequent positioned compartment 9a. FIG. 6 shows how the product 17 is thrown from the bottom of apparatus 1 and into the container 24 moving to the right.

As mentioned, the control of motor 6, and hence the cyclical movement of belt 7, is a result of the signal from light barrier 11, which is generated in connection with the pulse emitted by light source 13. Control device 30 controls motor 6 in such a manner so as to cause belt 7 to accelerate, stop, and resume motion, thus performing a cyclical motion.

Although considerable advantages are attained with the apparatus of the invention, it can obviously be manufactured using relatively few, simple and sturdy components. Hence, in accordance with the invention, an apparatus is created that advantageously accounts for the requirements associated with conveyor technology, is favorable in terms of cost, and is extremely reliable in operation because of its simple and sturdy construction.

The invention now being fully described, it will be apparent to one of ordinary skill in the art that any changes and modifications can be made thereto without departing from the spirit or scope of the invention as set forth herein.

What is claimed:

1. An apparatus for loading containers of a distributing conveyor with flat product, comprising:

an endless belt including a plurality of ribs defining at least one compartment forming a support surface for supporting the flat product;

means for moving said endless belt in a cyclical motion between resting positions for conveying the flat product supported on said support surface into a container; and a cover element that forms with said at least one compartment a laterally open shaft into which the flat product is deposited.

2. The apparatus as defined in claim 1, wherein the flat products comprise pieces of mail.

3. The apparatus as defined in claim 1, wherein said support surface is inclined.

4. The apparatus as defined in claim 1, wherein said ribbed belt defines a running direction, and said compartment has an opening through which the flat product can be inserted into said at least one compartment in a direction transverse to the running direction of said ribbed belt.

5. The apparatus as defined in claim 1, further comprising a side stop positioned adjacently to said at least one compartment to serve as a stop for product inserted into said at least one compartment.

6. The apparatus as defined in claim 1, further comprising guide means located above said at least one compartment for guiding the flat product into said at least one compartment.

7. The apparatus as defined in claim 1, wherein said endless ribbed belt defines an upper run located at an incline.

8. The apparatus as defined in claim 1, wherein said cover comprises an upper wall that forms a guide for the flat product to be deposited.

9. The apparatus as defined in claim 1, wherein said cover comprises a side wall that forms a lateral stop for the flat product to be deposited.

* * * * *